(12) United States Patent
Yeddala et al.

(10) Patent No.: US 10,091,667 B2
(45) Date of Patent: Oct. 2, 2018

(54) UPSTREAM/DOWNSTREAM NETWORK CONTROL, MANAGEMENT OF MOBILE COMMUNICATION DEVICES AND CORRESPONDING COMMUNICATIONS THROUGH ONE OR MORE WIRELESS ACCESS POINTS

(71) Applicant: Time Warner Cable Enterprises LLC, St. Louis, MO (US)

(72) Inventors: Kiran R. Yeddala, Ashburn, VA (US); Don Gunasekara, Reston, VA (US); Ahmed Bencheikh, Lorton, VA (US)

(73) Assignee: Time Warner Cable Enterprises LLC, Saint Louis, MO (US)

( * ) Notice: Subject to any disclaimer, the term of this patent is extended or adjusted under 35 U.S.C. 154(b) by 51 days.

(21) Appl. No.: 14/469,624

(22) Filed: Aug. 27, 2014

(65) Prior Publication Data
US 2016/0066199 A1  Mar. 3, 2016

(51) Int. Cl.
| | |
|---|---|
| *H04W 24/02* | (2009.01) |
| *H04W 28/02* | (2009.01) |
| *H04W 28/10* | (2009.01) |
| *H04W 72/12* | (2009.01) |
| *H04W 72/04* | (2009.01) |
| *H04W 28/26* | (2009.01) |
| *H04L 12/911* | (2013.01) |

(Continued)

(52) U.S. Cl.
CPC .......... *H04W 24/02* (2013.01); *H04L 47/745* (2013.01); *H04W 28/0289* (2013.01); *H04W 28/10* (2013.01); *H04W 28/26* (2013.01); *H04W 72/0493* (2013.01); *H04W 72/1257* (2013.01); *H04W 28/20* (2013.01); *H04W 88/14* (2013.01); *H04W 92/045* (2013.01)

(58) Field of Classification Search
CPC ...... H04L 5/003–5/0035; H04L 5/0037; H04L 5/0042; H04L 5/0091–5/0098; H04W 24/02; H04W 28/0289; H04W 72/0493; H04W 72/12; H04W 72/1205; H04W 72/121; H04W 72/1226; H04W 72/1231; H04W 72/1236; H04W 72/1257; H04W 72/1263; H04W 72/1278; H04W 28/26; H04W 28/10; H04W 28/20; H04W 88/14; H04W 92/045
See application file for complete search history.

(56) References Cited

U.S. PATENT DOCUMENTS

| | | | | |
|---|---|---|---|---|
| 5,999,561 | A * | 12/1999 | Naden | H04B 1/707 375/142 |
| 2004/0179547 | A1* | 9/2004 | Kuffner | H04L 1/0003 370/465 |
| 2015/0373672 | A1* | 12/2015 | Forssell | H04L 47/76 370/329 |

\* cited by examiner

*Primary Examiner* — Joshua Kading
(74) *Attorney, Agent, or Firm* — Armis IP Law, LLC

(57) ABSTRACT

A policy engine receives monitor information indicating operating conditions of both a wireless network and corresponding communication link. Multiple communication devices share the wireless network to communicate with a wireless access point. The wireless access point is in communication with a remote network such as the Internet through the corresponding communication link. To control end-to-end communications between the communication devices and the remote network, the policy engine produces policy information based on the received monitor information. The policy engine or other suitable resource initiates execution of the policy to control subsequent conveyance of communications over a combination of: i) the wireless network, and ii) the corresponding communication link.

27 Claims, 7 Drawing Sheets

(51) Int. Cl.
*H04W 92/04* (2009.01)
*H04W 88/14* (2009.01)
*H04W 28/20* (2009.01)

UPSTREAM/DOWNSTREAM NETWORK CONTROL, MANAGEMENT OF MOBILE COMMUNICATION DEVICES AND CORRESPONDING COMMUNICATIONS THROUGH ONE OR MORE WIRELESS ACCESS POINTS

BACKGROUND

In general, conventional techniques exist to provide computer users network access. For example, a cable network provider can provide corresponding subscribers free WiFi™ access when respective subscribers happen to be in a vicinity of a WiFi™ access point operated by the cable network service provider. In certain instances, a cable network service provider installs thousands of wireless access points across the country for use by their subscribers. Accordingly, subscribers are able to access the Internet from many different locations.

To use WiFi™ access provided by a cable network service provider, users operate their respective communication devices to learn of one or more available WiFi™ access points in the area. In certain instances, the customers are able to select a corresponding WiFi™ access point with which to establish a wireless communication link. Assuming that a subscriber provides appropriate credentials indicating that they are authorized to use a wireless network provided by the service provider, the communication device is able to communicate through the wireless access point to a remote network such as the Internet.

Certain environments such as stadiums occupied by a large number of users typically require installation of many wireless access points. In stadium environments, many subscribers may be present in a particular geographical area and simultaneously attempt to access a respective network such as the Internet.

BRIEF DESCRIPTION OF EMBODIMENTS

Conventional techniques of providing wireless access to a remote network such as the Internet suffer from deficiencies. For example, in certain instances, many client devices in a stadium environment may be simultaneously operated in a particular region to communicate and connect to a common wireless access point. Typically, simultaneous usage of a high number of client devices in a particular region results in network congestion. In addition to causing poor transmission and reception rates, the high density of simultaneous users can result in the inability of one or more client devices in the particular region to connect with a respective wireless access point. Both of these conditions are undesirable.

Embodiments herein include novel ways to provide a better user experience based on end-to-end network control between multiple communication devices and a corresponding remote network such as the Internet.

For example, a network environment according to embodiments herein includes multiple communication devices in wireless communication with a wireless access point. Assume that the wireless access point is communicatively coupled to a corresponding gateway resource. The gateway resource facilitates communications over a corresponding communication link to a remote network such as the Internet.

The network environment can include one or more monitor resources such as a first monitor resource and a second monitor resource. The first monitor resource monitors one or more parameters (such as client count, bandwidth utilization, floor noise, SNR, air quality, etc.) of the wireless network providing connectivity between the multiple communication devices and the corresponding wireless access point. The second monitor resource monitors one or more parameters of the corresponding communication link connecting the gateway resource to the remote network.

Each of the monitor resources can be configured to produce corresponding monitor information. For example, the first monitor resource can be configured to monitor a downstream location (such as a wireless network) of a network environment and produce monitor information indicating usage of the wireless network. The second monitor resource can be configured to monitor an upstream location (such as a backhaul communication link) of the network environment and produce monitor information indicating usage of the corresponding communication link. If desired, the first monitor resource and the second monitor resource can be combined into a single monitor resource.

The network environment includes a policy engine. The policy engine (such as processor hardware, software, method, etc.) receives the monitor information from the one or more monitor resources. In one embodiment, the policy engine receives monitor information indicating operating conditions of the wireless network as well as monitor information indicating operating conditions associated with the corresponding upstream-located communication link. Based on the received monitor information, the policy engine derives a policy (i.e., produces policy information) controlling future usage the wireless network and corresponding communication link.

Via respective policy information, the policy engine controls end-to-end communications between each of the multiple communication devices and the remote network. For example, embodiments herein can further include initiating execution of the policy to control subsequent conveyance of communications over a combination of: i) the wireless network, and ii) the corresponding communication link. In this manner, via receipt of monitor information, the policy engine and any of one or more related resources is able to control end-to-end performance of a respective network and provide a better user experience to each of one or more users.

In one embodiment, access points provide per AP (Access Point) level and per associated client level RF (Layer 1) parameters to a centralized controller. A centralized controller aggregates the feedback received from all the APs in a group/zone to analyze the overall health of the RF environment. The controller, based on these parameters, adjusts and improves the AP and corresponding wireless client Layer 1 communications. A location analytics engine can be configured to collect geo location information with respect to an AP and the foot traffic of a wireless client. The policy control engine handles the subscriber policy and control such as authentication, accounting, bandwidth profile per client/group of clients etc. The policy enforcer such as a gateway resource provides the enforcement function received from the policy control engine.

As mentioned above, according to conventional techniques, there is no synchronization between the Access Layer (APs, Controllers, Location Analytics) and a corresponding backend network (Policy Control, Policy Enforcement). For example, the access elements (e.g., wireless access points) have vendor specific proprietary implementations for RF Optimization and Location Analytics. The remote network side has the vendor specific implementation for policy control and enforcement. While both the elements could provide some level of customization for the service providers, there is currently no provision and/or interface available to use the intelligence from the access network (Layer 1) and use them on the top layers in the network (Layer 2 and Layer 3) to provide enhanced user access. As described herein, in contrast to conventional techniques, embodiments herein introduce ways to utilize the current AP (Access Point) vendor's environmental performance parameters to control and modify the client's network parameters on a respective egress gateway.

These and other more specific embodiments are disclosed in more detail below.

Note that any of the resources as discussed herein can include one or more computerized devices, servers, base stations, wireless communication equipment, communication management systems, workstations, handheld or laptop computers, etc., to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware, cause the computer processor hardware of the system to: receive monitor information indicating operating conditions of a wireless network and corresponding communication link, the wireless network being shared by multiple communication devices to communicate with a wireless access point, the wireless access point in communication with the network through the corresponding communication link; derive a policy based on the received monitor information; and initiate execution of the policy to control subsequent conveyance of communications: i) over the wireless network, and ii) over the corresponding communication link One or more embodiment includes a computer readable storage medium and/or system having instructions stored thereon. The instructions, when executed by computer processor hardware, cause the computer processor hardware of the system to: monitor a wireless network of multiple communication devices in communication with a wireless access point, the wireless access point coupled to a remote network via a communication link; allocate wireless bandwidth in the wireless network to the multiple communication devices to communicate with the wireless access point; and dedicate a portion of bandwidth over the corresponding communication link between the gateway resource and the network in accordance with the wireless bandwidth allocated to the multiple communication devices.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in network environments to control end-to-end communications between user operated communication devices and a corresponding remote network. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
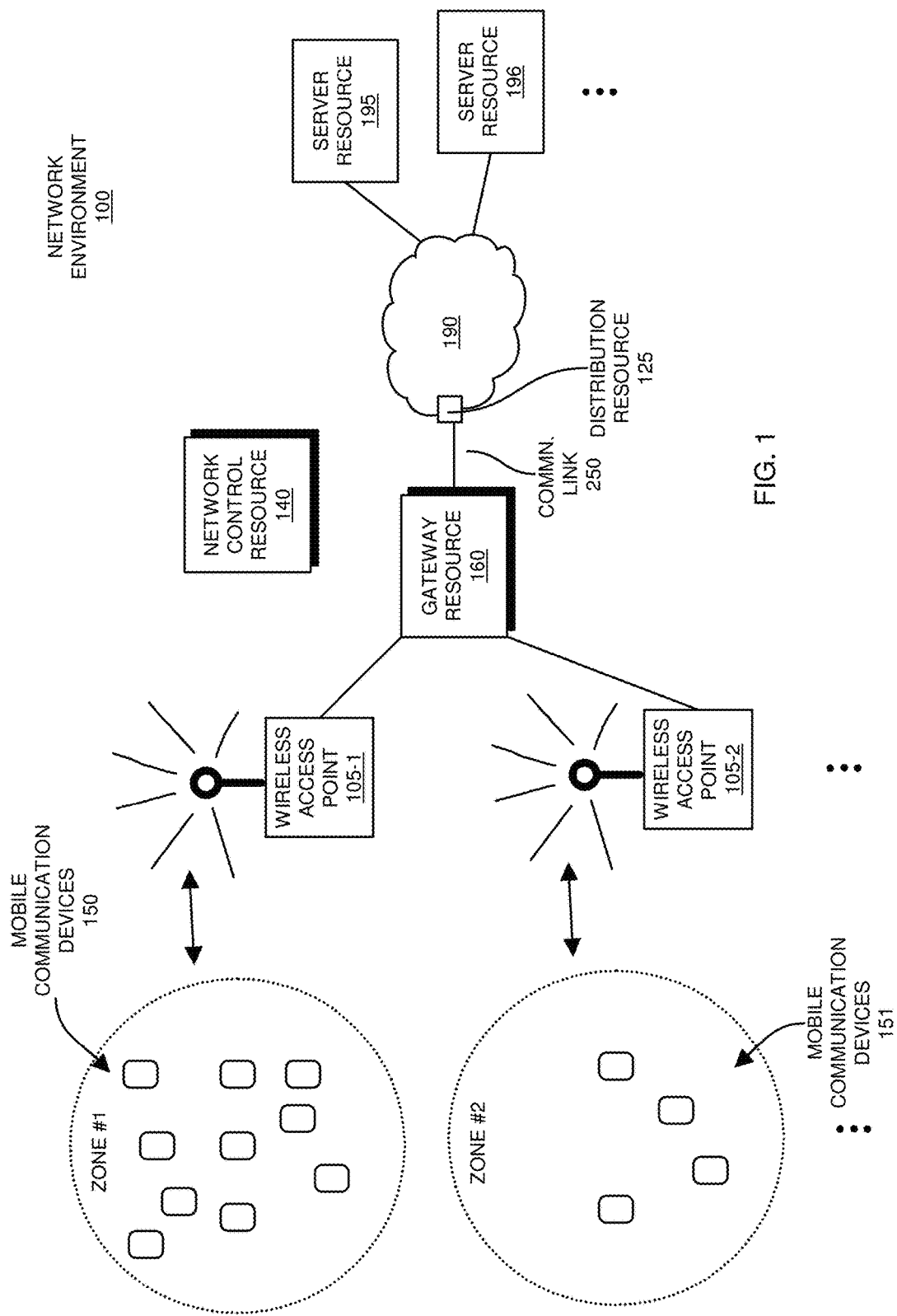
FIG. 1 is an example diagram illustrating a network environment including a network control resource (such as a policy engine) according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with embodiments herein, a policy engine (such as a network access control resource as further discussed below) controls access to a network. For example, the policy engine receives monitor information indicating operating conditions of both a wireless network and corresponding communication link through which the multiple communication devices communicate with a remote network. To control end-to-end communications between the communication devices and the remote network, the policy engine produces policy information based on the received monitor information. The policy information indicates how to control subsequent conveyance of end-to-end communications over a combination of: i) the wireless network, and ii) the corresponding communication link. Thus, via generation of policy information, the policy engine controls both an upstream and downstream portion of a respective network to facilitate communications between the mobile communication devices and a respective remote network such as the Internet.

Now, more specifically, FIG. 1 is an example diagram illustrating network access management in a network environment using a network control resource according to embodiments herein. Note that each of the functional blocks (such as wireless access point 105-1, gateway resource 160, network control resource 140, etc.) in network environment 100 represents hardware and/or software to carry out functionality as discussed herein.

As shown, network environment 100 includes multiple zones of mobile communication devices. For example, the zone #1 includes mobile communication devices 150; zone #2 includes mobile communication devices 151; and so on.

Each zone can include one or more access points to provide respective users of the mobile communication devices access to network 190.

In this example embodiment, assume that the zone #1 (such as serving a first geographical region) provides corresponding occupants access to network 190 through wireless access point 105-1; assume that zone #2 (such as serving a second geographical region) provides corresponding occupants access to network 190 through wireless access point 105-2; and so on.

Further, during operation, the gateway resource 160 facilitates connectivity between the one or more communication devices 150 and the shared communication link 250 (such as one or more cables, fiber-optic links, hardware links, etc.). For example, the wireless access point 105-1 facilitates conveyance of communications received from mobile communication devices 150 to gateway resource 160. The wireless gateway 160 transmits the communications received from the wireless access point 105-1 upstream over the shared communication link 250 to network 190.

In an opposite direction, wireless gateway 160 can receive downstream communications from one or more remote resources (such as server resource 195, server resource 196, etc.) in network 190 over the shared communication link 250. The gateway resource 160 forwards the downstream communications to wireless access point 105-1, that, in turn, distributes the communications to the appropriate mobile communication device 150.

In an upstream direction of the network environment 100, note that gateway resource 140 can be configured to encapsulate data packets (communications from the mobile communication devices 150) received from the wireless access point 105-1 prior to transmitting such data packets over shared communication link 250 upstream to distribution resource 125 (such as a cable modem termination system) providing access to network 190. In one embodiment, the gateway resource 160 (such as using cable modem functionality) wraps or encapsulates the data packets with delivery information facilitating a transfer of the data packets to the upstream distribution resource 125. The upstream distribution resource 125 removes the delivery information and forwards the unwrapped data packets over network 190 (such as a packet-switched network). The network 190 facilitates distribution of the data packets to appropriate destination addresses such as to any of one or more servers (such as server resource 195, server resource 196, etc.).

In a reverse direction, if desired, the distribution resource 125 can be configured to encapsulate communications received from network 190 and transmit corresponding encapsulated data packets to the gateway resource 160. For example, the distribution resource 125 can receive a data packet addressed for delivery to communication device 150-1. In such an instance, the distribution resource 125 encapsulates the data packet with delivery information for delivery of the data packet to gateway resource 160. The gateway resource 160 receives the data packet and removes the delivery information and forwards the respective unwrapped data packet downstream to wireless access point 105-1 for subsequent delivery over a corresponding communication link to mobile communication device 150-1.

As an alternative to encapsulating data packets, note that the gateway resource 160 and corresponding communication link 250 can be configured to support routing of data packets in accordance with a respective client/server communication protocol.

As further shown, network environment 100 includes network control resource 140. As its name suggests, network control resource 140 controls conveyance of communications in network environment as more specifically shown and discussed in FIG. 2.

Figure 2:
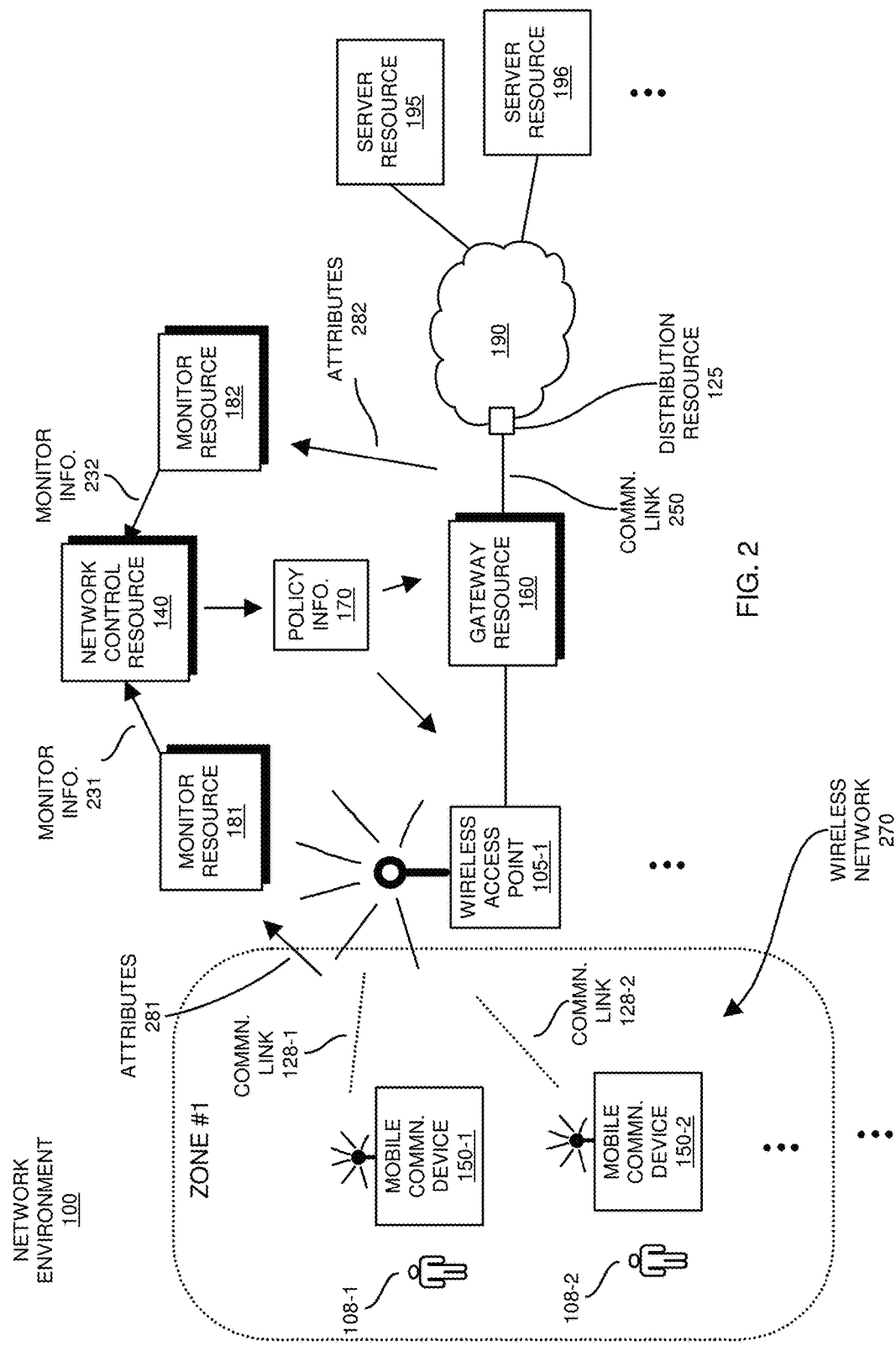
FIG. 2 is an example diagram illustrating a more detailed view of an enhanced network environment including a network control resource configured to control end-to-end communications according to embodiments herein.

FIG. 2 is an example diagram illustrating more specific details of implementing a network control resource and related functionality according to embodiments herein.

As further shown in this example embodiment, network environment 100 includes one or more networks such as a packet-switched network facilitating distribution of communications (such as data packets). In one embodiment, one or more of networks supports switching of data packets using source and destination address information.

In general, via communications through wireless access point 105-1 and gateway resource 160, each of the mobile communication devices 150 (mobile communication device 150-1, mobile communication device 150-2, etc.) in zone #1 are able to simultaneously communicate with any of one or more server resources such as server resource 195, server resource 196, etc.

In one embodiment, the mobile communication devices 150 are playback devices able to retrieve and playback different types of content available from resources in network 190. Each of the mobile communication devices 150 can include a respective display screen to play back a rendition of retrieved content.

As previously discussed, each of the communication devices 150 in zone 1 communicates with wireless access point 105-1. For example, communication link 128-1 supports communications between wireless communication device 150-1 and wireless access point 105-1; communication link 128-2 supports communications between communication device 150-2 and wireless access point 105-1; and so on.

The wireless access point 105-1 can communicate with the communication devices 150 via any suitable protocol or WiFi™ standards such as IEEE (Institute of Electrical and Electronics Engineers) 802.11a, 802.11b, 802.11g, 802.11n, 802.11ac, etc.

As previously discussed, in an upstream direction, gateway resource 160 facilitates forwarding of data from communication devices 150 upstream over communication link 250 to network 190. In a downstream direction, gateway resource 160 facilitates distribution of content received over shared communication link 250 to the communication devices 150.

By further way of a further non-limiting example, any of network 190 and other resources in network environment 100 can support client-server type communications. For example, subsequent to establishing communication link 128-1, communication device 150-1 operated by a respective user 108-1 can generate a request for retrieval of content from a particular server resource such as server resource 195 using an appropriate network address assigned to server 195. Assuming that the communication device 150-1 has already established a respective communication link 128-1 with wireless access point 105-1, the communication device 150-1 transmits the request over communication link 128-1 to wireless access point 105-1. On behalf of the communication device 150-1, the wireless access point 105-1 transmits the request for content to the gateway resource 160. The gateway resource 160 further transmits the request for content over communication link 250 to server resource 195 in network 190.

In response to receiving the request for content, the server resource 195 transmits the requested content (such as over-the-top content) over network 190 and shared communication link 250 to the gateway resource 160. The gateway resource 160 forwards the received content to the access point 105-1. Wireless access point 105-1, in turn, forwards the communication over a wireless network 270 to the mobile communication device 150-1.

In a similar manner, each of the communication devices 150 can retrieve content via communications through wireless access point 105-1 and the wireless gateway 160.

As previously discussed, embodiments herein include novel ways to provide end-to-end network control between multiple communication devices and a corresponding remote network 190 such as the Internet.

For example, network environment 100 according to embodiments herein includes multiple communication devices 150 in zone #1. As previously discussed, each of the multiple communication devices 150 establishes a respective communication link with wireless access point 105-1. In this example embodiment, the user 108-1 operating mobile communication device 150-1 establishes a respective communication link 128-1 with wireless access point 105-1; user 108-2 operating mobile communication device 150-2 establishes a respective communication link 128-2 with wireless access point 105-1; and so on.

By way of further non-limiting example embodiment, wireless network 270 (including communication links 128) supports WiFi™ communications.

As previously discussed, network environment 100 includes gateway resource 160. The wireless access point 105-1 is communicatively coupled to corresponding gateway resource 160. As its name suggests, the gateway resource 160 facilitates conveyance of communications between wireless access point 105-1 and corresponding network 190. More specifically, in an upstream direction towards network 190, the gateway resource 160 facilitates transmission and reception of communications over corresponding communication link 250.

The network environment 100 further includes one or more monitor resources such as a first monitor resource 181 and a second monitor resource 182.

The first monitor resource 181 monitors one or more parameters (such as number of communication devices in communication with wireless access point 105-1, bandwidth utilization, floor noise, SNR, air quality, etc.) of the wireless network 270 providing connectivity between the multiple communication devices 150 and the corresponding wireless access point 105-1. The second monitor resource 182 monitors one or more parameters of the corresponding communication link 250 connecting the gateway resource 160 to the remote network 190.

Note that each of the monitor resources 181 and 182 can be located in any suitable one or more locations in network environment 100. In one embodiment, field-located devices such as a respective wireless access point, sensors, etc., located in a respective zone are configured to collect network environment health information associated with the wireless network 270. When used, the sensors can be configured to know their respective location based on GPS assistance or location in a respective indoor grid of multiple zones.

Each of the monitor resources 181 and 182 produces corresponding monitor information. For example, the first monitor resource 181 monitors attributes 281 or performance metrics (such as a number of mobile communication devices currently communicates with wireless access point 105-1, wireless bandwidth usage, floor noise, signal-to-noise ratio, the precise location of each of the mobile communication devices and corresponding users, etc.) associated with a downstream portion of network environment 100 (such as a wireless network 270) and produces the corresponding monitor information 231 associated with the wireless network 270. The generated monitor information 231 indicates one or more operating conditions associated with the wireless network 270 such as: i) a number of communication devices 150 communicating with the wireless access point 105-1, ii) an aggregate wireless bandwidth assigned to and/or use by the multiple communication devices 150 to communicate with the wireless access point 105-1, iii) an amount of noise in the wireless network 270, iv) a Signal-to-Noise Ratio (SNR) and Received Signal Strength Indicator (RSSI) associated with communications in the wireless network 270, v) quality of the respective communication links 128, vi) congestion, etc.

The second monitor resource 182 monitors attributes 282 or performance metrics (such as uplink/downlink, quality of service, traffic prioritization, aggregate bandwidth in the communication link 250 assigned to support communications from the zone of mobile communication devices, ability/inability to transmit the data packets upstream to remote network 190 over communication link 250, etc.) associated with upstream portion of the network environment 100 (such as communication link 250) and produces monitor information 232 indicating usage of the corresponding communication link 250 (such as a backhaul communication link).

If desired, the first monitor resource 181 and the second monitor resource 182 can be combined into a single monitor resource to monitor network environment 100.

In yet further embodiments, the network environment 100 includes network control resource 140 (such as a policy engine). The network control resource 140 (such as processor hardware, software, method, etc.) receives the monitor information 181 and 182 from the one or more monitor resources. Via monitor information 231 and 232, the monitor resources 181 and 182 apprise network control resource 140 of operating conditions of the wireless network 270 as well as operating conditions associated with the corresponding communication link 250.

In one embodiment, the network control resource 140 includes an analytics engine configured to analyze end-to-end network performance between the multiple communication devices 150 in a particular zone and a remote network 190.

Based on the end-to-end network performance as indicated by received monitor information 231 and 232, a policy control engine in the network control resource 140 derives policy information 170 (i.e., one or more policies) specifying control of resources associated with communication link 250 and/or wireless network 270. For example, in one embodiment, the network control resource 140 produces policy information 170 to include: i) a first set of control rules indicating how to configure the wireless network 270 and ii) a second set of control rules indicating how to configure the corresponding communication link 250.

In one embodiment, a combination of the first set of control rules and the second set of control rules in policy information 170 indicates how to control the subsequent conveyance of the communications over the wireless access point 105-1 and corresponding communication link 250. For example, policy information 170 can be configured to specify how to allocate the use of resources such as bandwidth in the wireless network 270 and corresponding communication link 250.

The network control resource 140 forwards portions of the policy information 170 to any of one or more resources in network environment 100 to carry out execution. For example, in one embodiment, the network control resource 140 forwards the first set of control rules (a first portion of policy information 170) to the wireless access point 105-1. The wireless access point 105-1 implements the first set of control rules to control conveyance of subsequent communications between the wireless access point 105-1 and the multiple communication devices 150. The network control resource 140 forwards the second set of control rules to gateway resource 160. The gateway resource 160 implements the second set of rules to control conveyance of subsequent communications over the corresponding communication link 250 between the gateway resource 160 in the remote network 190.

In accordance with alternative embodiments, note that the network control resource 140 can be configured to forward the policy information 170 to gateway resource 160. The gateway resource 160 uses a portion of the policy information 170 to identify how to control communications over communication link 250. The gateway resource 160 communicates an appropriate portion of the policy information 170 to wireless access point 105-1.

The control rules can be configured to control any suitable parameter. As a further example embodiment, the first set of control rules can be configured to specify allocation of wireless bandwidth in the wireless network 270 for use by each of the multiple communication devices 150. The second set of control rules can be produced to specify an amount of bandwidth in the corresponding communication link 250 allocated to convey communications associated with the multiple communication devices and/or corresponding zones.

As yet a further example, the network control resource 140 can be configured to analyze the received monitor information 231 and 232. Based on analysis of the monitor information 231 and 232, the network control resource 140 produces the policy information 170 to: i) control network layer 1 between the multiple communication devices 150 and the wireless access point 105-1, and ii) control network layer 2 or network layer 3 on the corresponding communication link 250 between the wireless access point 105-1 and the remote network 190.

Thus, via respective policy information 170, the network control resource 140 controls end-to-end communications between each of the multiple communication devices 150 and the remote network 190. For example, embodiments herein include initiating execution of the policy information 170 to control subsequent conveyance of communications over a combination of: i) the wireless network 270 (which normally may be controlled by a respective vendor), and ii) the corresponding communication link 250 (which may be controlled by a respective cable network service provider). In this manner of controlling end-to-end communications, the network control resource 140 and any of one or more related resources (such as wireless access point 105-1, the resource 160, etc.) is able to provide a better user experience to each of one or more users accessing respective network 190 through a wireless access point.

In accordance with yet further embodiments, a cable network service provider owns and operates the communication link 250 and corresponding gateway resource 160, which may be located in a corresponding venue or event location where network environment 100 and corresponding zones reside. The cable network service provider provides bandwidth of the communication link 250 for use by a corresponding vendor that operates one or more respective wireless access points. Alternatively, the cable network service provider may own and operate both the communication link 250 as well as corresponding wireless access points 105.

In accordance with further embodiments as further discussed herein, the network control resource 140 produces the policy information 170 to synchronize: i) allocation of bandwidth in the wireless network 270 supporting communications between the wireless access point 105-1 and the multiple communication devices 150, and ii) allocation of bandwidth in the corresponding communication link 250 supporting conveyance of the communications between the wireless access point 105-1 and the multiple communication devices 150. If desired, the network control resource 140 allocates sufficient bandwidth in the corresponding communication link 250 to support an aggregate of bandwidth and corresponding communications conveyed over the wireless network 270 between the wireless access point 105-1 and the multiple communication devices 150.

More specifically, based at least in part on monitor information 231 and 232, the network control resource 140 can be configured to modify an allocation of bandwidth over the corresponding communication link 250 between the gateway resource 160 and the network 190 depending upon an amount of wireless bandwidth in wireless network 270 allocated to the multiple communication devices 150 to communicate over the wireless network 270 to the wireless access point 105-1.

For example, a first party (such as a vendor) operating wireless access point 105-1 may allow additional users of respective mobile communication devices 150 to establish a connection with wireless access point 105-1. The monitor resource 181 can be configured to detect this condition (increase number of users in zone 1) based on monitoring received attributes 281 indicating an increase in the number of mobile communication devices in zone #1. Via monitor information 231 generated by monitor resource 181, the network control resource 140 detects the condition such as an increased number of mobile communication devices in zone #1. In other words, via the monitor information 231 produced by monitor resource 181, the network control resource 140 can be configured to detect congestion in wireless network 270 that limits one or more of the multiple communication devices 150 from communicating through the wireless access point 105-1 and the communication link 250 to the remote network 190.

In response to detecting a condition such as an increase in the number of mobile communication devices in zone #1 and/or occurrence of congestion (lower communication performance) as a result of the increased number of use devices, assuming that the communication link 250 is the bottleneck, the network control resource 140 allocates additional bandwidth on the communication link 250 to support the aggregate of communications associated with the mobile communication devices in zone #1. Thus, initially, the communication link 250 and originally assigned bandwidth of communication link 250 may be a bottleneck causing congestion. However, the increase in allocated bandwidth on communication link 250 to accommodate the additional mobile communication devices 150 in zone #1 reduces and/or eliminates the bottleneck. Accordingly, a portion of bandwidth of the corresponding communication link 250 that the network control resource 140 dedicates or allocates for use by the mobile communication devices in zone #1 may vary depending upon the wireless bandwidth associated with wireless network 270 allocated to the multiple communication devices.

Further examples of allocating bandwidth based upon performance of a wireless network 270 and/or communication link 250 are discussed below.

Figure 3:
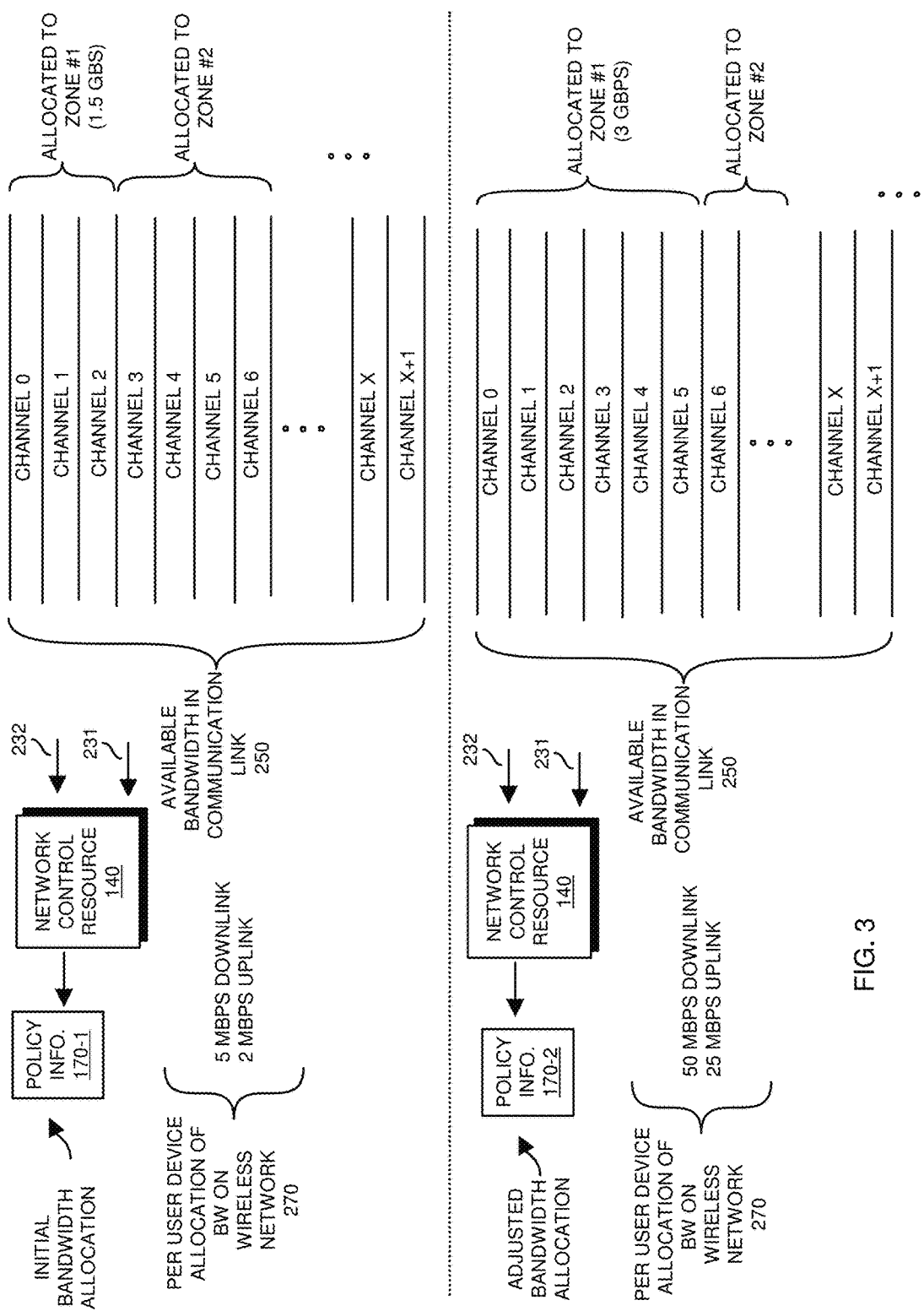
FIG. 3 is an example diagram illustrating allocation of bandwidth at different locations of the network according to embodiments herein.

FIG. 3 is an example diagram illustrating generation of policy information according to embodiments herein. Note that the following discussion refers to both FIG. 2 and FIG. 3.

As shown in FIG. 3, network control resource 140 produces initial policy information 170-1 and updated policy information 170-2.

Assume in this example that, via the policy information 170-1, the network control resource 140 initially allocates to each mobile communication device 5 MBS (Mega Bits per Second) of wireless bandwidth in the downlink direction (such as from the wireless access point 105-1 to a respective mobile communication device) and 2 MBS in the uplink direction (such as from the respective mobile communication device to the wireless access point 105-1). Assume further in this example that the network control resource 140 allocates a limited bandwidth of 1.5 GBS (GigaBits per Second) in an upstream and downstream direction on communication link 250 to support the aggregate conveyance of communications associated with zone #1.

As previously discussed, the network control resource 140 continuously receives monitor information 231 indicating a performance associated with conveyance of communications in wireless network 270. Assume in this example that the monitor information 231 indicates that an aggregate measurement of wireless bandwidth actually used by the communication devices 150 to receive and/or transmit data through the wireless access point 105-1 is above a threshold value. Additionally, assume in this example that the monitor information 231 indicates that a signal-to-noise (SNR) & RSSI ratio associated with the wireless network 270 (such as communications between the mobile communication devices and the wireless access point 105-1) is below a threshold value. Whether considered individually or combined, these conditions indicate possible network congestion resulting in a respective bad user experience of transmitting and/or receiving data over wireless access point 105-1.

In response to detecting that the detected actual aggregate wireless bandwidth used by communication devices in zone #1 is greater than a wireless bandwidth threshold value and that the signal-to-noise ratio associated with wireless communications in wireless network 270 is less than a signal-to-noise ratio threshold value (indicating congestion associated with network 270), the network control resource 140 produces policy information 170-2, increasing an assigned per-user wireless bandwidth associated with each of the communication devices. For example, the network control resource 140 produces updated policy information 170-2 in which each of the mobile communication devices 150 in zone #1 is allocated 50 MBS on the downlink and 25 MBS on the uplink instead of the original allocation of 5 MBS downlink/2 MBS uplink on the wireless network 270.

In certain instances, in addition to allocating additional bandwidth in the wireless network 270, the network control resource 140 can be configured to modify the amount of bandwidth of corresponding communication link 250 allocated for conveyance of corresponding data associated with the mobile communication devices 150 in zone #1 to accommodate the increase in wireless bandwidth allocated to corresponding mobile communication devices 150. For example, as shown, initially, the network control resource can be configured to produce policy information 170-1 to allocate 3 channels of the available bandwidth on communication link 250 (or a total of 1.5 GBS, assuming that each channel supports 0.5 GBS) to support conveyance of communications associated with mobile communication devices 150 in zone #1.

In addition to substantially increasing an amount of wireless uplink and downlink bandwidth in wireless network 270 allocated to each of the mobile communication devices 150 in zone #1 as discussed above, the network control resource 140 can be configured to produce updated policy information 170-2 to increase the number of channels of the corresponding communication link 250 that are allocated to support communications associated with zone #1. In this example embodiment, the network control resource 140 produces policy information 170-2, increasing the allocation of bandwidth on the communication link 250 from the initial 1.5 GBS (such as 3 channels) to 3 GBS (such as 6 channels).

As previously discussed, the network control resource 140 forwards the updated policy information 170-2 to gateway resource 160 and/or wireless access point 105-1 to carry out the new allocations as specified by policy information 170-2.

Note that the partitioning of the available bandwidth of communication link 250 into a number of channels (supporting such as 500 MBS each) is shown by way of non-limiting example only. The available bandwidth associated with communication link 250 can be partitioned in any suitable manner.

Accordingly, embodiments herein include modifying an allocation of bandwidth over the corresponding communication link 250 between the gateway resource 160 and the network 190 depending upon operating conditions of the multiple communication devices 150 communicating over the wireless network 270 to the wireless access point 105-1.

Note that in a similar manner, the network control resource 140 can be configured to allocate different portions of available bandwidth on communication link 250 to each of the different zones and corresponding mobile communication devices.

Figure 4:
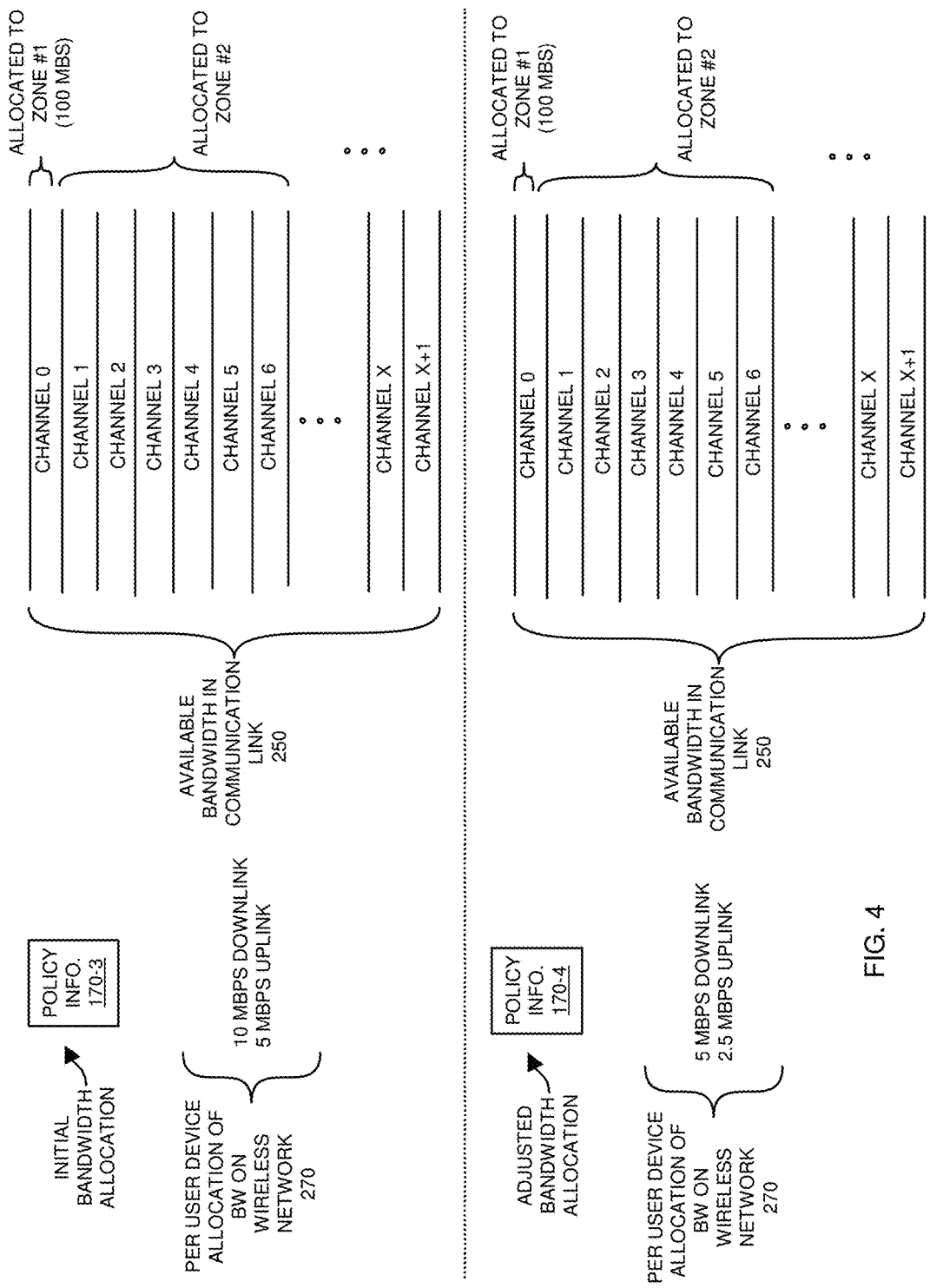
FIG. 4 is an example diagram illustrating allocation of bandwidth at different locations of the network according to embodiments herein.

FIG. 4 is an example diagram illustrating generation of policy information according to embodiments herein. Note that the following discussion refers to both FIG. 2 and FIG. 4.

In this embodiment, assume that a respective vendor (such as a hotel owner) that provides one or more users (such as persons renting rooms in the hotel) of mobile communication devices access to remote network 190 is limited to using only a certain portion of the bandwidth available and corresponding communication link 250. For example, assume that the vendor is allowed use of a fixed amount of bandwidth of up to 100 MBS to support an aggregate conveyance of communications associated with mobile communication devices 150 in zone #1 over communication link 250 to remote network 190.

Assume in this example that via the policy information 170-3, the network control resource 140 initially allocates 10 MBS (Mega Bits per Second) of wireless bandwidth in the downlink direction (such as from the wireless access point 105-1 to a respective mobile communication device) and 5 MBS in the uplink direction (such as from the respective mobile communication device to the wireless access point 105-1).

Assume further in this example that the network control resource 140 receives monitor information 231 indicating a change in performance associated with conveyance of communications in wireless network 270 as a result of an increase number of mobile communication devices establishing a respective communication link with wireless access point 105-1. In a manner as previously discussed, the increase in the number of mobile communication devices 150 in zone #1 is detected by the network control resource 140 via analysis of a respective monitor information 231. To accommodate the increased number of users in zone #1, and provide fairness amongst users operating mobile communication devices 150 in zone 1, the network control resource 140 reduces the amount of wireless bandwidth associated with wireless network 270 that is allocated for use by each of the corresponding mobile communication devices 150.

More specifically, as shown, the network control resource 140 produces the updated policy information 170-4 to indicate that each of the user devices 150 is now allocated use of 5 MBS on the downlink and 2.5 MBS on the uplink of the wireless network 270. In other words, each user is allocated less uplink and downlink bandwidth. Because the vendor purchases a fixed amount of bandwidth on the corresponding communication link 250, there is no change to the bandwidth (500 MBS) of communication link 250 allocated to zone #1 for conveyance of communications over communication link 250 to network 190.

As previously discussed, the network control resource 140 forwards the updated policy information 170-4 to gateway resource 160 to carry out the new allocations.

Accordingly, embodiments herein include modifying an allocation of wireless bandwidth available in wireless network 270 depending upon operating conditions of the multiple communication devices 150 communicating over the wireless network 270 to the wireless access point 105-1.

Figure 5:
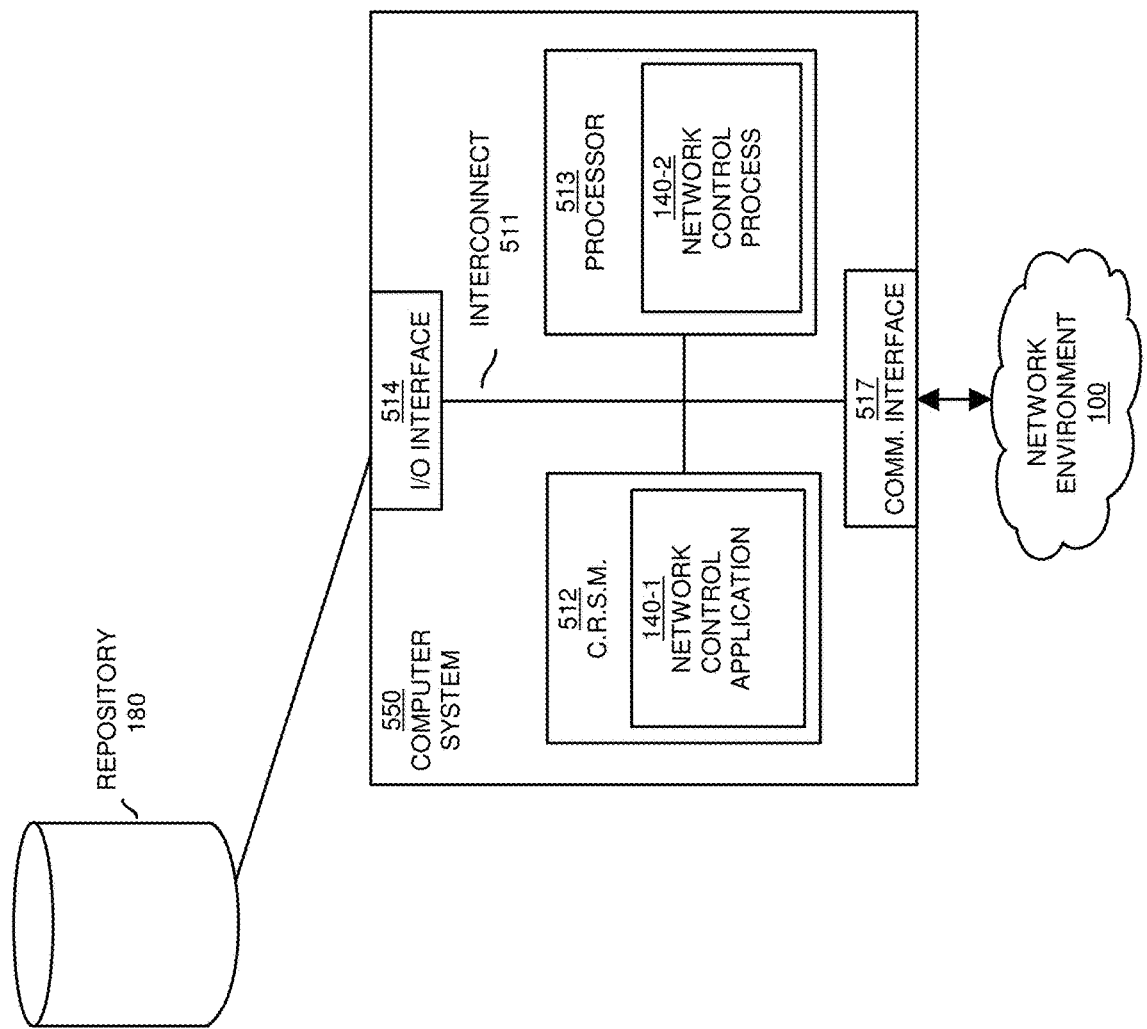
FIG. 5 is a diagram illustrating an example computer architecture in which to execute any of the functionality according to embodiments herein.

FIG. 5 is a diagram illustrating an example computer architecture in which to execute any of the functionality according to embodiments herein. Any of the different processing techniques can be implemented via execution of software code on computer processor hardware.

For example, as shown, computer system 550 (e.g., computer processor hardware) of the present example can include an interconnect 511 that couples computer readable storage media 512 (C.R.S.M.) such as a non-transitory type of media (i.e., any type of hardware storage medium) in which digital information can be stored and retrieved. The computer system 550 can further include processor 513 (i.e., computer processor hardware such as one or more processor co-located or disparately located processor devices), I/O interface 514, communications interface 517, etc.

Computer processor hardware (i.e., processor 513) can be located in a single location (such as in wireless gateway 140) or can be distributed amongst multiple locations.

As its name suggests, I/O interface 514 provides connectivity to resources such as repository 180, control devices, one or more display screens, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 enables the computer system 550 and processor resource 513 to communicate over a resource such as any of networks 190. I/O interface 514 enables processor resource 513 to access data from a local or remote location, control a respective display screen, receive input, etc.

As shown, computer readable storage media 512 can be encoded with network control application 140-1 (e.g., software, firmware, etc.) executed by processor 513. Network control application 140-1 can be configured to include instructions to implement any of the operations as discussed herein.

During operation of one embodiment, processor 513 accesses computer readable storage media 512 via the use of interconnect 511 in order to launch, run, execute, interpret or otherwise perform the instructions in network control application 140-1 stored on computer readable storage medium 512.

Execution of the network control application 140-1 produces processing functionality such as network control process 140-2 in processor resource 513. In other words, the network control process 140-2 associated with processor resource 513 represents one or more aspects of executing network control application 140-1 within or upon the processor resource 513 in the computer system 550.

Those skilled in the art will understand that the computer system 550 can include other processes and/or software and hardware components, such as an operating system that controls allocation and use of hardware resources to execute network control application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 550 may reside at any location or multiple locations in network environment 100. The computer system 550 can be included in any suitable resource in network environment 100 to implement functionality as discussed herein.

Note that each of the other functions as discussed herein (such as monitor resource 181, monitor resource 182, wireless access point 105-1, gateway resource 160, etc.) can be executed in a respective computer system based on execution of corresponding instructions.

Figure 6:
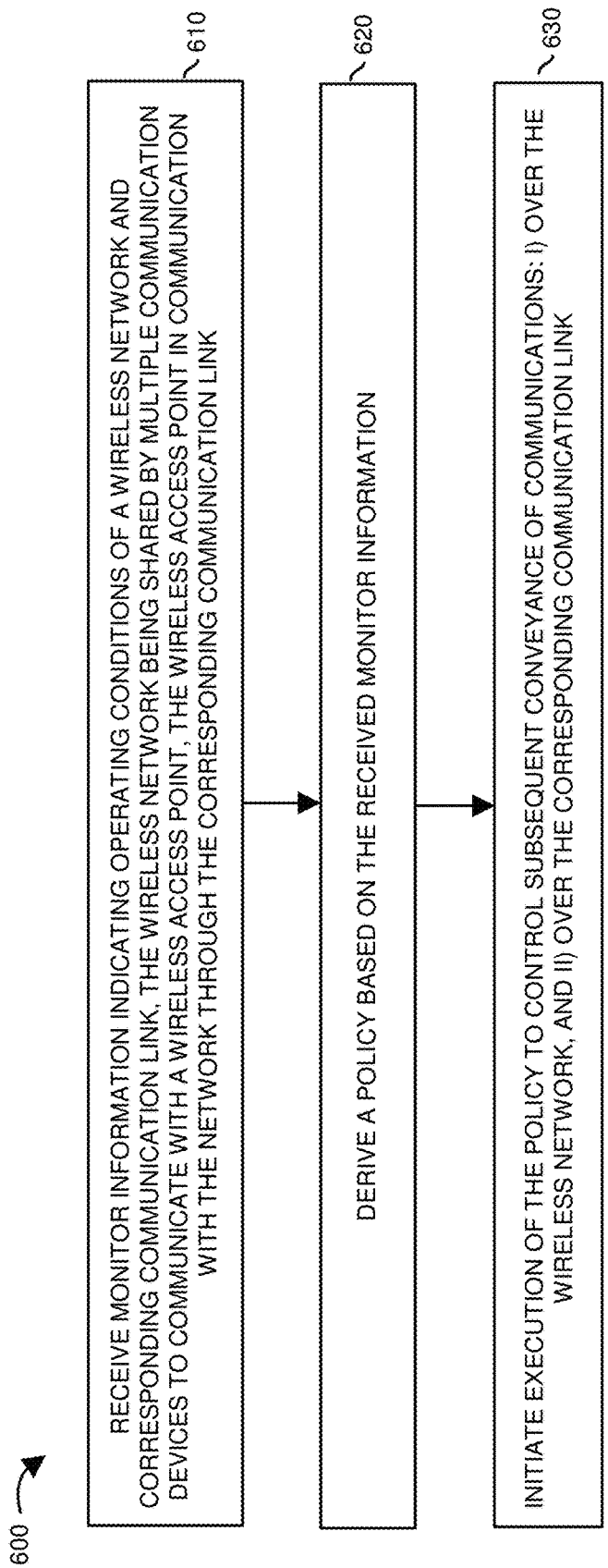
FIG. 6 is an example diagram illustrating a method of controlling end-to-end communications according to embodiments herein.

FIG. 6 is a flowchart 600 illustrating an example method according to embodiments. Note that there will be some overlap with respect to concepts as discussed above.

In processing block 610, the network control resource 140 receives monitor information 231 and 232 indicating operating conditions of wireless network 270 and corresponding communication link 250. As previously discussed, the multiple communication devices 150 share use of wireless network 270 to communicate with wireless access point 105-1. The wireless access point 105-1 communicates through the gateway resource 160 and corresponding communication link 250 to access network 190 and corresponding server resources.

In processing block 620, the network control resource 140 derives policy information 170 based on the received monitor information 231 and 232.

In processing block 630, the network control resource 140 initiates execution of the policy information 170 to control subsequent conveyance of communications: i) over the wireless network 270, and ii) over the corresponding communication link 250.

Figure 7:
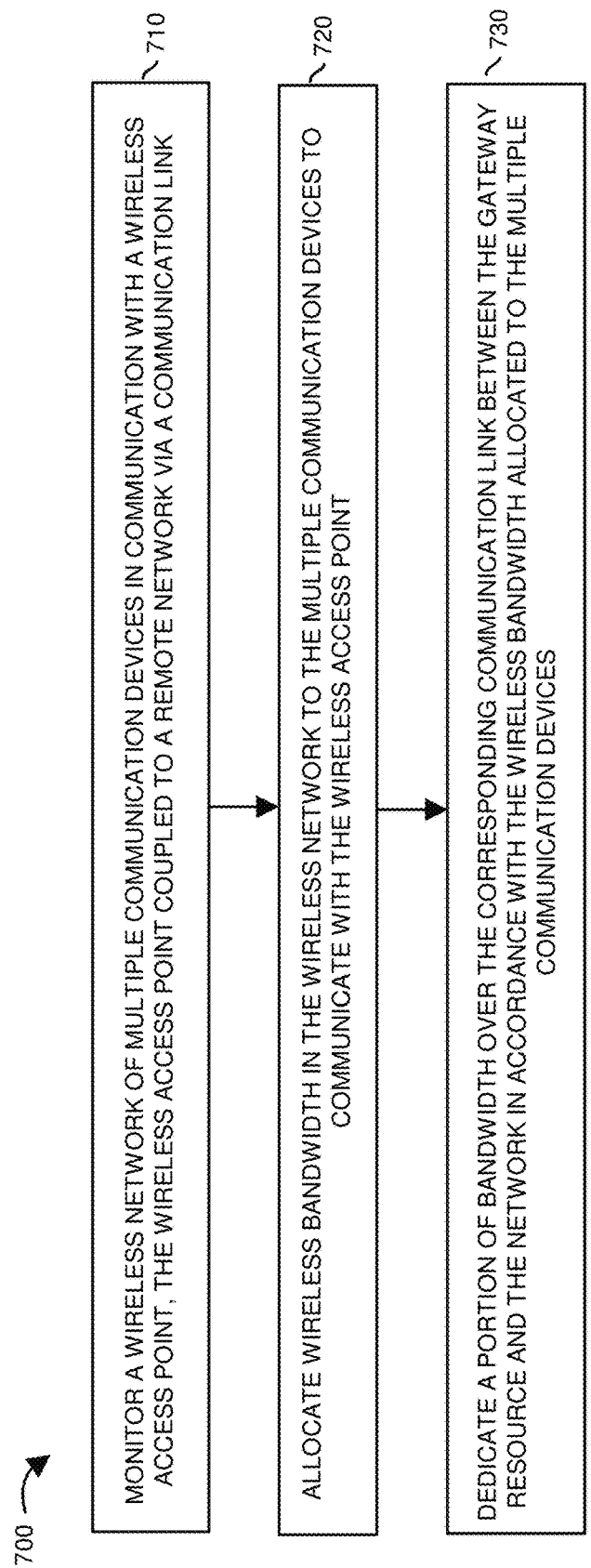
FIG. 7 is an example diagram illustrating a method of controlling end-to-end communications according to embodiments herein.

FIG. 7 is a flowchart 700 illustrating an example method according to embodiments. Note that there will be some overlap with respect to concepts as discussed above.

In processing block 710, the monitor resource 181 monitors wireless network 270 of multiple communication devices 150 in communication with wireless access point 105-1. As previously discussed, the wireless access point 105-1 is communicatively coupled to a remote network 190 via through gateway resource 160 and communication link 250.

In processing block 720, the network control resource 140 allocates wireless bandwidth in the wireless network 270 to the multiple communication devices 150 to communicate with the wireless access point 105-1.

In processing block 730, the network control resource 140 dedicates a portion of bandwidth over the corresponding communication link 250 between the gateway resource 160 and the network 190 in accordance with the wireless bandwidth allocated to the multiple communication devices 150. For example, if the network controller resource 140 increases the amount of bandwidth in wireless network 270 allocated to each of the mobile communication devices 150, the network control resource 140 also increases the amount of bandwidth on the corresponding communication link 250 supporting such communications. Conversely, if the network controller resource 140 decreases the amount of bandwidth in wireless network 270 allocated to each of the mobile communication devices 150, the network control resource 140 also decreases the amount of bandwidth on the corresponding communication link 250 supporting such communications. In this manner, the network control resource 140 facilitates a degree of synchronization between wireless network 270 and corresponding communication link 250.

Note again that techniques herein are well suited for controlling network access to provide better end user experiences. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been (or inventions have been) particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

via processor hardware controlling a wireless access point in a wireless environment, performing operations of:

receiving monitor information indicating operating conditions of a wireless network and a corresponding communication link, the wireless network being shared by multiple communication devices to communicate with the wireless access point, the wireless access point in communication with a remote network through the corresponding communication link;

deriving a policy based on the operating conditions of the wireless network as indicated by the received monitor information; and initiating execution of the policy to control subsequent conveyance of communications: i) over the wireless network between the multiple communication devices and the wireless access point, and ii) over the corresponding communication link;

wherein the monitor information indicates: i) an aggregate of actual wireless bandwidth used by the communication devices to receive data from the wireless access point, and ii) a signal-to-noise ratio associated with the wireless network and reception of the data, the method further comprising:

in response to detecting that the aggregate wireless bandwidth is greater than a wireless bandwidth threshold value and that the signal-to-noise ratio of communications in the wireless network is less than a signal-to-noise ratio threshold value, increasing an assigned per-user wireless bandwidth allocated for use by each of the communication devices in the wireless network; and producing the policy to indicate the increased per-user wireless bandwidth.

2. The method as in claim 1, wherein deriving the policy based on the received monitor information further comprises: i) producing a first set of control rules indicating how to control the wireless network, ii) producing a second set of control rules indicating how to control the corresponding communication link; and wherein a combination of the first set of control rules and the second set of control rules indicates how to control the subsequent conveyance of the communications over the wireless access point and corresponding communication link.

3. The method as in claim 2, wherein initiating execution of the policy to control subsequent conveyance of communications includes:

forwarding the first set of control rules to the wireless access point, the wireless access point implementing the first set of control rules to control the subsequent conveyance of the communications between the wireless access point and the multiple communication devices; and forwarding the second set of control rules to a gateway resource disposed between the wireless access point and the corresponding communication link, the gateway resource implementing the second set of rules to control the subsequent conveyance of the communications over the corresponding communication link between the gateway resource and the remote network.

4. The method as in claim 3, wherein the first set of control rules specifies allocation of wireless bandwidth in the wireless network for use by each of the multiple communication devices; and wherein the second set of control rules specifies an amount of bandwidth in the corresponding communication link allocated to convey communications associated with the multiple communication devices.

5. The method as in claim 1, wherein initiating execution of the policy to control the subsequent conveyance of communications further comprises:

executing the policy to control the conveyance of a first portion of subsequent communications over the corresponding communication link, the corresponding communication link disposed between a gateway resource that receives the first portion of subsequent communications from the wireless access point and the remote network, the gateway resource controlling forwarding of the first portion of subsequent communications upstream over the corresponding communication link to the remote network; and executing the policy to control the conveyance of a second portion of the subsequent communications over the wireless network, the wireless access point controlling subsequent communications downstream over the wireless network to the multiple communication devices.

6. The method as in claim 1 further comprising:

allocating an increased amount of bandwidth on the corresponding communication link for use by the multiple communication devices to communicate with the remote network; and producing the policy to indicate the increased amount of bandwidth allocated on the corresponding communication link.

7. The method as in claim 1, wherein deriving the policy further comprises: producing the policy to synchronize: i) allocation of bandwidth in the wireless network supporting communications between the wireless access point and the multiple communication devices, and ii) allocation of bandwidth in the corresponding communication link supporting conveyance of the communications between the wireless access point and the multiple communication devices; and wherein producing the policy further comprises: allocating sufficient bandwidth in the corresponding communication link to support an aggregate of communications conveyed over the wireless network between the wireless access point and the multiple communication devices.

8. The method as in claim 1 further comprising:

modifying an allocation of bandwidth over the corresponding communication link between a gateway resource and the remote network depending upon operating conditions of the multiple communication devices communicating over the wireless network to the wireless access point.

9. The method as in claim 1 further comprising:

modifying an allocation of bandwidth over the corresponding communication link between a gateway resource and the remote network depending upon an amount of wireless bandwidth allocated to the multiple communication devices to communicate over the wireless network to the wireless access point.

10. The method as in claim 1, wherein deriving the policy further comprises:

modifying bandwidth allocated on the corresponding communication link to accommodate a change in wireless bandwidth allocated to support communications between the wireless access point and the multiple communication devices.

11. The method as in claim 1 further comprising:

subsequent to initial use of the wireless network to convey data between the multiple communication devices and the wireless access point, updating the policy to allocate sufficient bandwidth in the corresponding communication link to support an aggregate of bandwidth allocated in the wireless network supporting wireless communications between the wireless access point and the multiple communication devices.

12. The method as in claim 1, wherein the wireless access point is a first wireless access point providing wireless connectivity to a first zone of communication devices;
   wherein the corresponding communication link provides the first wireless access point and a second wireless access point access to the remote network, the second wireless access point providing wireless connectivity to a second zone of communication devices;
   the method further comprising:
      adjusting an allocation of bandwidth in the corresponding communication link between the first wireless access point and the second wireless access point depending on wireless bandwidth usage by the first zone of communication devices and the second zone of communication devices.

13. The method as in claim 12, wherein the monitor information indicates the bandwidth usage, the method further comprising:
   adjusting the allocation of bandwidth in the corresponding communication link in response to detecting that the wireless bandwidth usage by the first zone of communication devices is greater than a wireless bandwidth threshold value.

14. The method as in claim 1 further comprising:
   in accordance with the policy, synchronizing an amount of wireless bandwidth allocated to convey communications over the wireless network to an amount of communication bandwidth allocated over the corresponding communication link, the communication bandwidth of the corresponding communication link allocated to convey the communications received over the wireless network to a remote network.

15. The method as in claim 14, wherein synchronizing includes:
   dynamically modifying the amount of communication bandwidth allocated on the corresponding communication link to accommodate a change in the amount of wireless bandwidth allocated to support the communications between the wireless access point and the multiple communication devices.

16. The method as in claim 15, wherein the change is an increase in wireless bandwidth allocated between the wireless access point and the multiple communication devices; and
   wherein the synchronizing includes increasing the amount of communication bandwidth allocated on the corresponding communication link to accommodate the increase in wireless bandwidth.

17. The method as in claim 1, wherein deriving the policy based on the operating conditions of the wireless network as indicated by the received monitor information includes:
   increasing an amount of communication bandwidth allocated on the corresponding communication link to accommodate an increase in an amount of wireless bandwidth allocated to support communications between the wireless access point and the multiple communication devices.

18. The method as in claim 1, wherein the processor hardware produces the derived policy to adjust an amount of bandwidth in the corresponding communication link allocated to convey communications associated with the wireless network.

19. The method as in claim 1 further comprising:
   allocating an increased amount of bandwidth in the corresponding communication link for use by the multiple communication devices to communicate with the remote network; and
   producing the policy to indicate the increased amount of bandwidth allocated in the corresponding communication link for use by the multiple communication devices to communicate with the remote network.

20. A system comprising:
   computer processor hardware; and
   a hardware storage resource coupled to communicate with the computer processor hardware, the hardware storage resource storing instructions that, when executed by the computer processor hardware, cause the computer processor hardware to:
      receive monitor information indicating operating conditions of a wireless network and corresponding communication link, the wireless network being shared by multiple communication devices to communicate with a wireless access point, the wireless access point in communication with a remote network through the corresponding communication link;
      derive a policy based on the operating conditions of the wireless network as indicated by the received monitor information; and
      initiate execution of the policy to control subsequent conveyance of communications: i) over the wireless network, and ii) over the corresponding communication link;
      wherein the monitor information indicates: i) an aggregate of actual wireless bandwidth used by the multiple communication devices to receive data from the wireless access point, and ii) a signal-to-noise ratio associated with the wireless network and reception of the data, the computer processor hardware further operable to:
         in response to detecting that the aggregate wireless bandwidth is greater than a wireless bandwidth threshold value and that the signal-to-noise ratio of communications in the wireless network is less than a signal-to-noise ratio threshold value, increase an assigned per-user wireless bandwidth allocated for use by each of the communication devices in the wireless network; and
         produce the policy to indicate the increased per-user wireless bandwidth.

21. The computer system as in claim 20, wherein the computer processor hardware is further operable to: i) produce a first set of control rules indicating how to control the wireless network, ii) produce a second set of control rules indicating how to control the corresponding communication link; and
   wherein a combination of the first set of control rules and the second set of control rules indicates how to control the subsequent conveyance of the communications over the wireless access points and corresponding communication link.

22. The computer system as in claim 21, wherein the computer processor hardware is further operable to:
   forward the first set of control rules to the wireless access point, the wireless access point implementing the first set of control rules to control the subsequent conveyance of communications between the wireless access point and the multiple communication devices; and
   forward the second set of control rules to a gateway resource disposed between the wireless access point and the corresponding communication link, the gateway resource implementing the second set of rules to control the subsequent conveyance of communications over the corresponding communication link between the gateway resource and the network.

23. The computer system as in claim 20, wherein the computer processor hardware is further operable to:
   execute the policy to control the conveyance of a first portion of subsequent communications over the corresponding communication link, the corresponding communication link disposed between a gateway resource that receives the first portion of subsequent communications from the wireless access point and the remote network, the gateway resource controlling forwarding the first portion of subsequent communications upstream over the corresponding communication link to the network; and
   execute the policy to control the conveyance of a second portion of the subsequent communications over the wireless network, the wireless access point controlling the subsequent communications downstream over the wireless network to the multiple communication devices.

24. The computer system as in claim 20, wherein the computer processor hardware is further operable to:
   allocate an increased amount of bandwidth on the corresponding communication link for use by the multiple communication devices to communicate with the network; and
   produce the policy to indicate the increased amount of bandwidth allocated on the corresponding communication link.

25. The computer system as in claim 20, wherein the computer processor hardware is further operable to:
   produce the policy to synchronize: i) allocation of bandwidth in the wireless network supporting communications between the wireless access point and the multiple communication devices, and ii) allocation of bandwidth in the corresponding communication link supporting conveyance of the communications between the wireless access point and the multiple communication devices.

26. The computer system as in claim 20, wherein the computer processor hardware is further operable to:
   modify an allocation of bandwidth over the corresponding communication link between the gateway resource and the remote network depending upon operating conditions of the multiple communication devices communicating over the wireless network to the wireless access point.

27. Computer-readable hardware storage having instructions stored thereon, the instructions, when carried out by computer processor hardware, causes the computer processor hardware to:
   receive monitor information indicating operating conditions of a wireless network and corresponding communication link, the wireless network being shared by multiple communication devices to communicate with a wireless access point, the wireless access point in communication with a remote network through the corresponding communication link;
   derive a policy based on the operating conditions of the wireless network as indicated by the received monitor information; and
   initiate execution of the policy to control subsequent conveyance of communications: i) over the wireless network, and ii) over the corresponding communication link, the monitor information indicating: i) an aggregate of actual wireless bandwidth used by the communication devices to receive data from the wireless access point, and ii) a signal-to-noise ratio associated with the wireless network and reception of the data;
   in response to detecting that the aggregate wireless bandwidth is greater than a wireless bandwidth threshold value and that the signal-to-noise ratio of communications in the wireless network is less than a signal-to-noise ratio threshold value, increase an assigned per-user wireless bandwidth allocated for use by each of the communication devices in the wireless network; and
   produce the policy to indicate the increased per-user wireless bandwidth.

* * * * *